United States Patent
Quenzer et al.

(10) Patent No.: US 8,015,843 B2
(45) Date of Patent: Sep. 13, 2011

(54) METHOD AND DEVICE FOR SELECTIVELY CHANGING THE CONTOUR OF THE SURFACE OF AN OPTICAL LENS MADE OF GLASS OR A GLASS-TYPE MATERIAL

(75) Inventors: Hans-Joachim Quenzer, Itzehoe (DE); Peter Merz, Hademarschen (DE); Uwe Bott, Hademarchen (DE)

(73) Assignee: Fraunhofer-Gesellschaftzur Forderung der Angewandten Forschung E.V., Munich (DE)

( * ) Notice: Subject to any disclaimer, the term of this patent is extended or adjusted under 35 U.S.C. 154(b) by 1195 days.

(21) Appl. No.: 10/540,211

(22) PCT Filed: Dec. 19, 2003

(86) PCT No.: PCT/EP03/14629
§ 371 (c)(1),
(2), (4) Date: Jun. 20, 2005

(87) PCT Pub. No.: WO2004/056715
PCT Pub. Date: Jul. 8, 2004

(65) Prior Publication Data
US 2006/0096321 A1    May 11, 2006

(30) Foreign Application Priority Data
Dec. 20, 2002   (DE) .................................. 102 59 890

(51) Int. Cl.
*C03B 23/035*    (2006.01)
(52) U.S. Cl. .......................................... 65/102; 65/104
(58) Field of Classification Search .................... 65/17.3, 65/17.4, 25.1–25.4, 28, 29.1, 29.12, 29.15, 65/32.5, 37–39, 41, 47, 63, 64, 66, 73–76, 65/81–85, 93–95, 102, 104, 111, 117
See application file for complete search history.

(56) References Cited

U.S. PATENT DOCUMENTS
| | | | |
|---|---|---|---|
| 4,481,023 A * | 11/1984 | Marechal et al. | 65/64 |
| 6,951,119 B1 * | 10/2005 | Quenzer et al. | 65/102 |
| 6,974,264 B2 * | 12/2005 | Nakama et al. | 385/92 |
| 7,364,930 B2 * | 4/2008 | Quenzer et al. | 438/48 |

FOREIGN PATENT DOCUMENTS
| | | |
|---|---|---|
| DE | 199 56 654 | 6/2001 |
| GB | 2 264 890 A | 9/1993 |
| WO | 01/38240 A1 | 11/2000 |

* cited by examiner

OTHER PUBLICATIONS

Schulze, J et al., "Compact self-aligning assemblies with refractive microlens arrays made by contactless embossing", Proceeddings of the SPIE—The International Society for Optical Engineering, vol. 3289, Apr. 1998, pp. 22-32, USA.*

*Primary Examiner* — Matthew J Daniels
*Assistant Examiner* — Yana Belyaev
(74) *Attorney, Agent, or Firm* — Buchanan Ingersoll & Rooney PC

(57) ABSTRACT

A method and a device are disclosed for follow-up treatment of the contour of the surface of at least one optical lens, in particular a microlens which is made of glass or a glass-type material and which has a convex lens surface delimited by a circumferential line abutting on a plane section surrounding the circumferential line and which has a lens underside facing the convex lens surface. Along the circumferential line of the optical lens on the plane section is placed a device perfectly matching the circumferential line and at least laterally bordering the convex lens surface, the optical lens is heated to a temperature of at least the transformation temperature of glass or glass-type material, pressure equalization prevails between the convex lens surface and the lens underside, after a certain period of time, during which the optical lens undergoes the temperature treatment and subsequent cooling below the transformation temperature, the device is removed from the optical lens.

12 Claims, 1 Drawing Sheet

METHOD AND DEVICE FOR SELECTIVELY CHANGING THE CONTOUR OF THE SURFACE OF AN OPTICAL LENS MADE OF GLASS OR A GLASS-TYPE MATERIAL

This disclosure is based upon German Application No. 102 59 890.8, filed Dec. 20, 2002, and International Application No. PCT/EP2003/014629, filed Dec. 19, 2003, the contents of which are incorporated herein by reference.

TECHNICAL FIELD

The present invention relates to a method for follow-up treatment of the contour of the surface of at least one optical lens, in particular a microlens, which is made of glass or a glass-type material and has a convex lens surface delimited by a circumferential line, abutting on and surrounding which is a plane section.

PRIOR ART

WO 01/38240 A1 describes a method for fabricating micromechanical, but in particular microoptical, components in the form of microlenses which are made of a glass-type material and the size of the single elements of which goes into the sub-micrometer range. Used to produce such a type array-like arrangement of microlenses is a prestructured negative form preferably made of a semiconductor material and having a multiplicity of impressions. A layer of glass material is applied over the impressions and joined with the negative form preferably by means of anodic bonding. As part of a subsequent tempering process, in which the composite of negative form and layer of glass material is heated above the softening temperature of the glass material, the glass material begins to flow locally into the impressions. The focal length of each single forming microlens can be determined by the depth to which the glass material locally sinks into the individual impressions by means of a so-called flow process and which can be exactly set during the tempering step by the temperature, pressure and tempering time.

Remarkably, microlenses produced by means of such a "glass flow process" have an extremely steep elliptical gradient ("Übersteilung") at the edge region of each single lens, as shown in detail in FIG. 2. FIG. 2 shows, in a two-dimensional coordinate system, a family of continuous lines 1-4, each representing half of a cross section of a microlens. All four continuous lines have the same average radius of curvature at X=0 but differ in the edge region of the respective lens contour. The continuous line 1 corresponds to the lens cross section yielded by the aforedescribed glass flow process. By comparing, for example, the line cross section 1 with a sphere plotted as the continuous line 3, it becomes clear that the edge region of the continuous line 1 deviates from the sphere 3, particularly in the edge region of the microlens, to distinctly smaller radii of curvature, notably an, so to say, extremely steep elliptical gradient.

This extremely steep elliptical gradient of the microlens in the edge region stems from a process-inherent characteristic typical of glass flow processes and therefore occurs unfailingly. Moreover, similar extremely steep elliptical gradients can also be observed in microlenses produced from thermoplastic lens material by means of a so-called contactless hot stamping process. Particularly, in cases in which microlenses produced in this manner are used for optical imaging, in which the entire lens surface is utilized for imaging, the extremely steep elliptical gradients lead to disadvantageous imaging errors that should be avoided.

SUMMARY OF THE INVENTION

The object of the present invention is to treat optical lenses, in particular microlenses the shape of the cross section of whose lenses has production-inherent extremely steep elliptical gradients in the edge region, in such a manner that disadvantageous optical imaging properties related to these extremely steep elliptical gradients can be completely avoided. The measures for avoiding extremely steep elliptical gradients should not require technically complicated and expensive process steps, and moreover it should be possible to apply them to already produced lenses.

Based on the optical lenses, preferably arrays of microlenses, produced according to the state of the art obtained by means of a glass flow process, for example using the method described in WO 01/38240 A1, lenses having an extremely steep elliptical lens cross-sectional shape undergo a follow-up treatment step designed according to the present invention, in which at least the extremely steep elliptical gradient in the edge region of each single microlens is removed in a controlled manner.

The invented method for follow-up treatment of the contour of the surface of at least one optical lens which is made of glass or a glass-type material, in particular a microlens, and has a convex shaped lens surface delimited by a circumferential line abutting on a plane section surrounding the circumferential line, comprises at least the following two process steps:

First a means exactly matching the circumferential line and at least laterally delimiting the convex lens surface is applied along the circumferential line of the to-be-treated optical lens on the plane section surrounding the circumferential line. In a simplest embodiment variant the template-like means, preferably made of a material whose thermal expansion properties are identical or very similar to the thermal expansion properties of the to-be-treated lens material, is designed simply as a hole template, whose hole cutout matches exactly the shape and size of the circumferential line. In this manner, the means delimits the convex lens surface on the side, respectively laterally, but does not otherwise come in contact with it. Subsequently, the optical lens is heated to a temperature of at least the transformation temperature of the glass or the glass-type material, thereby softening the lens material which is locally displaced due to the surface tension prevailing in longitudinal direction of the lens surface in such a manner that a material flow inside the lens body commences. It is important to equalize the pressure between the top surface and the bottom surface of the lens.

Thus in the softening state of the lens material, the surface tensions acting along the convex lens surface are able to tendentiously reduce the surface of the lens, with the lens material from the region of the convex-side exceedingly steep elliptical gradient of the lens being displaced, respectively flowing back into the other region of the lens body. Due to this tempering process, referred to as reflow process, the extremely steep elliptical gradients in the edge region are decreased, respectively completely avoided. By appropriate presetting of certain process parameters that determine the tempering process, such as pressure, temperature and tempering time, particularly the edge regions of the to-be-treated microlens can assume spherical, parabolic or even hyperbolic edge contour geometries, as is described in detail in the following.

After the desired edge geometry has been obtained, the tempering process is ended, and following corresponding cooling below the transformation temperature, the optical lens is accordingly separated from the template-like applied means.

BRIEF DESCRIPTION OF THE DRAWINGS

The present invention is made more apparent in the following using preferred embodiments with reference to the accompanying drawings by way of example without the intention of limiting the scope or spirit of the overall inventive idea.

WAYS TO CARRY OUT THE INVENTION, COMMERCIAL APPLICABILITY

Figure 1:
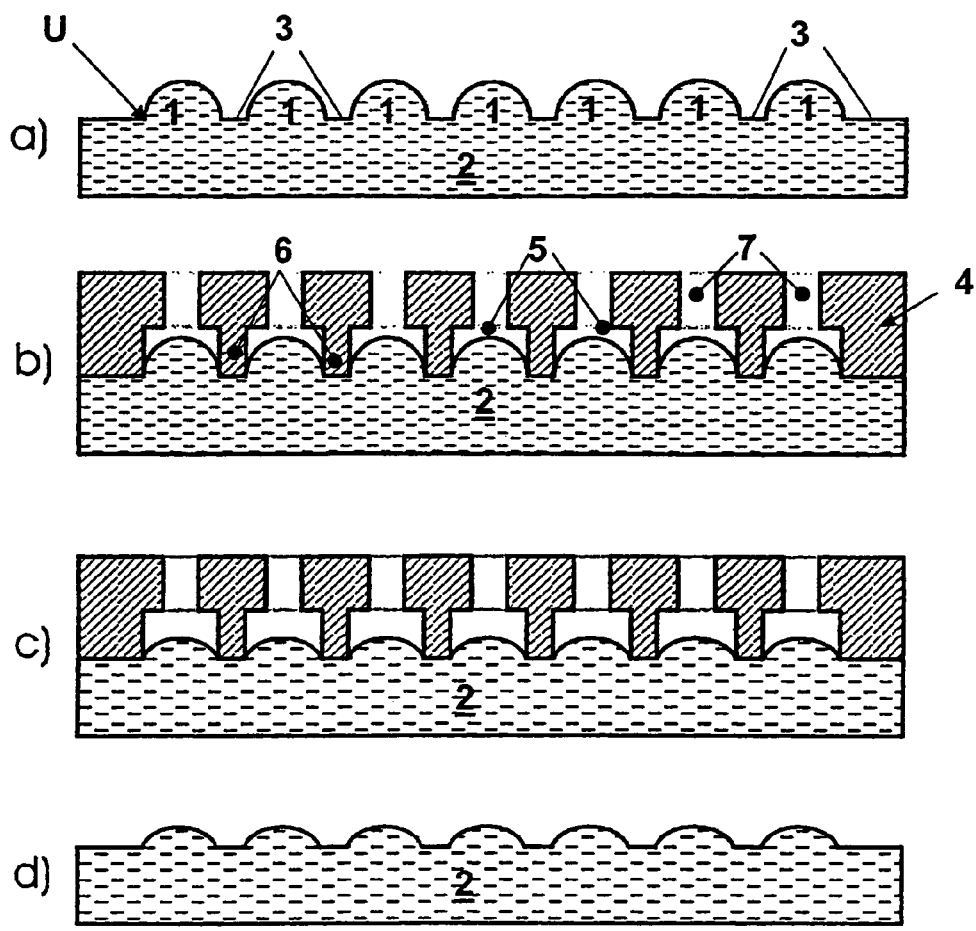
FIGS. 1a-d show schematic process steps for conducting the thermal reflow process and FIG. 2 shows a diagram for representing different shapes of lens cross sections.
Figure 2:
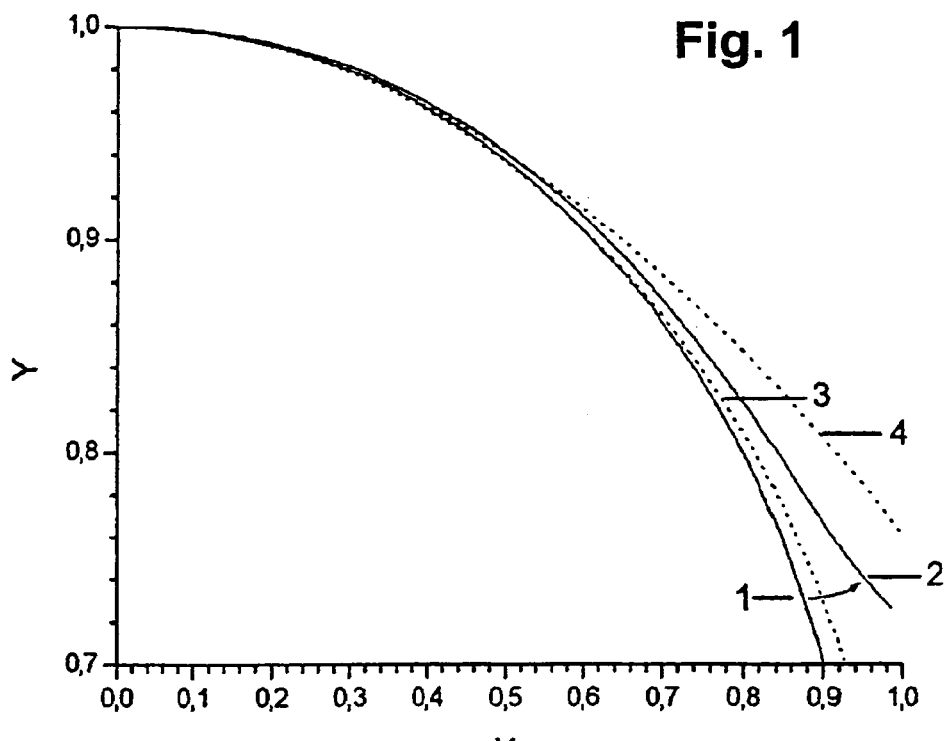

FIG. 1a shows a stylized representation of a cross section of an array of microlenses having 7 microlenses 1 arranged one after the other in a row and preferably has been produced by means of a glass flow process. The individual microlenses 1 rise above the plane of the glass lens substrate 2, preferably made of boric silicate glass, for example Pyrex® glass, joining the individual microlenses 1. Each of the individual microlenses 1 is delimited by a circumferential line U on which a plane section 3 abuts which spatially separates the two immediately adjacent microlenses 1. As already mentioned in the preceding, the edge regions of the individual microlenses 1 have extremely steep elliptical gradients due to their process of fabrication, i.e. the surface contour of each single microlens deviates in its edge region from an ideal sphere toward smaller lens radii. Such a type contour design, in particular, in the edge region of each single lens is shown in detail with reference to the diagrammatic representation in FIG. 2, which according to the contour line 1 possesses an extremely steep elliptical gradient in the edge region of the lens in comparison to a spherical lens contour (see continuous line 3). The reason for such an extremely steep elliptical gradient is the flow behavior of the viscous lens material into the template-given impressions in a structured mask occurring in the course of a glass flow process in lens production.

In order to reduce, respectively completely eliminate, the extremely steep elliptical gradient in the edge region, according to the representation in FIG. 1b, a means designed as a counter tool 4 is placed on the array of microlenses. The counter tool 4 is constructed with a shape which is complementary to the micro lens array and surrounds the individual optical microlenses 1 along their circumferential lines U. In the simplest case, the counter tool 4 is constructed as a template-like hole diaphragm, with hole cutouts whose hole contours match the shape and size of the circumferential lines of the individual microlenses.

The counter tool 4 shown in FIG. 1b is provided with cutouts 5, which are stylized complementarily to the shape of the convex lens forms of the microlenses 1, with the convex lens surfaces of the microlenses 1 extending into the space regions of the cutouts 5. The otherwise fillet-like designed intermediate sections 6 of the counter tool 4 match exactly with the contour of the plane sections 3 located between the microlenses 1 and cover the same, matching exactly in contour when brought into contact with the glass substrate 2.

In order to produce an as close as possible contact between the counter tool 4 and the lens substrate 2, the counter tool 4 is pressed onto the plane sections 3 of the substrate of the lens or firmly joined thereto by means of anodic bonding. In order to prevent the build up of overpressure in the space regions 5 between the glass substrate 4 and the lens substrate 2 during contacting, openings 7 are provided in the counter tool 4 to equalize the pressure between the interior and the exterior of the counter tool 4. Similarly, as will be described in the following, via the openings 7 adjustable pressure conditions can selectively act directly on the convex lens surface of the single microlenses.

If the temperature treatment described in the following is conducted under vacuum conditions, a counter tool can be used whose individual impression does not have any openings as pressure problems do not occur under vacuum conditions.

In a further process step, the composite lens substrate 2 and counter tool 4 undergo a temperature treatment far above the transition temperature, respectively transformation temperature, of glass, due to which the prevailing surface tension alters the shape of the profile of each single microlens in such a manner that the extremely steep elliptical gradient in the edge region of each single microlens is completely leveled, respectively conveyed into a counter-curved profile shape. According to the representation in FIG. 1c, the counter tool 4 prevents lateral flowing away of the single microlenses so that the lateral geometrical dimensions of each single microlens are retained during the temperature treatment. The horizontal arrangement of the array of microlenses during the temperature treatment and the surface reduction effect of the lens-surface-determining surface tension leads to material displacement from each single lens body in the direction of the plane substrate located therebeneath. This material flow, referred to as reflow process, fundamentally leads to an overall changing of the surface contour of each single microlens but contributes in particular to leveling the profile in the edge region of each single microlens. Depending on the temperature level and tempering time, the reflow process permits producing the desired edge leveling as shown in the diagrammatic representation according to FIG. 2. Due to the extremely steep elliptic gradient of the edge shape according to the continuous line 1, spherical edge contours according to continuous line 3, parabolic or even hyperbolic edge contours according to continuous lines 2 and 4 can be selectively produced. The longer the tempering process lasts, the more the edge region of each single microlens is leveled and can ultimately assume the surface contour indicated by the continuous line 4. The aforedescribed reflow process occurs under normal pressure conditions so that the force inducing the material flow stems solely from the surface tension acting on each single microlens. Moreover, the pressure conditions can be changed during the tempering process. Thus, increasing the pressure acting evenly on each single lens surface results in a reflow-process-aiding force component which leads to more intense leveling of the lens profile. On the other hand, reducing the pressure acting on the lens surface produces a reflow-process-counteracting force component, which stabilizes the, for example convex, lens surface during the tempering step. Thus temperature, tempering time and the pressure acting on the lens surfaces are decisive process parameters that can be set individually depending on the desired outcome of the tempering process.

As already mentioned, the counter tool 4 only touches the array of microlenses solely along the circumferential lines and on the plane sections 3 disposed between the microlenses. The edge regions of the counter tool, which touch the circumferential lines of each single microlens, may not touch the edge of each single microlens in a wetting manner as in this case additional edge angle effects may occur which could have a lasting negative effect on the contour of the lens surface in the edge region. In order to ensure that the counter tool is not wetted by the lens material in the edge region, it has proven to be beneficial to make the counter tool, for example, of graphite. For one, graphite safely endures the temperatures of approximately between 600 and 800° C. occurring during the temperature treatment and, in addition, possesses the property of not being wetted by soft glass. Moreover, tests have shown that a counter tool made of silicon also does not have any wetting effects with the softened lens material as in the case of glass as lens material, glass does not come in direct contact with the silicon tool, because an intermediate layer forms between the flowing glass and the silicon tool. Although the intermediate layer is also made of glass, it however possesses distinctly higher viscosity than the actual glass substrate and therefore does not or hardly flows. The reason for the occurrence of such an intermediate layer is, according to present knowledge, a local change in the composition of the glass brought in contact with the silicon surface by means of anodic bonding, in which sodium ions, which appear to be determining for the viscosity of glass, wander locally out of the glass.

Following the temperature treatment and corresponding cooling of the lens material, the counter tool 4 is removed from the surface of the microlens array. The counter tool, which is preferably made of silicon, can be removed from the microlens array, for example, using state-of-the-art etching techniques. Possible irregularities occurring on the rear side of the lens substrate due to the reflow process during the temperature treatment can be leveled using suited mechanical abrading or polishing techniques.

What is claimed is:

1. A method for follow-up treatment of the contour of the surface of at least one as-formed convex optical lens, the method comprising:
    providing the as-formed convex optical lens which is made of glass or a glass-type material and which has a convex lens surface delimited by a circumferential line abutting on a plane section surrounding said circumferential line and which has an opposing surface of the lens facing the convex lens surface, and wherein said optical lens is produced by means of a glass-flow process or by means of contactless hot stamping of a thermoplastic material and has as a result of said process an elliptical gradient in the region of said circumferential line,
    placing along said circumferential line of the as-formed convex optical lens on said plane section a means matching said circumferential line and at least laterally bordering said convex lens surface,
    performing a temperature treatment comprising heating said as-formed convex optical lens to a temperature of at least the transformation temperature of said glass or glass-type material, wherein pressure equalization prevails between said convex lens surface and said opposing surface of the lens, and said temperature treatment is conducted in conjunction with said means bordering said circumferential line in such a manner that said elliptical gradient is reduced or completely eliminated,
    removing said means from said optical lens after a period of time, during which said optical lens undergoes said temperature treatment and subsequent cooling below said transformation temperature
    wherein the steps are performed in the recited sequence and result in the modification of the elliptical gradient.

2. The method according to claim 1, wherein the temperature and the period of time of said temperature treatment are selected according to the degree of change of the surface contour.

3. The method according to claim 1, comprising varying the pressure acting on said convex lens surface during said temperature treatment.

4. The method according to claim 1, comprising pressing said means with force against said circumferential line.

5. The method according to claim 1, wherein said temperature treatment is conducted in conjunction with said means bordering said circumferential line in such a manner that the lateral geometric dimensions of said optical lens are retained.

6. The method according to claim 1, wherein the convex lens surface of said optical lens is raised above a horizontal plane during the temperature treatment.

7. The method according to claim 1, wherein said means is brought into contact with said optical lens without wetting the surface.

8. The method according to claim 1, wherein the at least one optical lens comprises a one-piece continuous array-like microlens having a multiplicity of single optical microlenses, which are spaced apart, by plane sections, a means matching the arrangement and size of the circumference of the single microlenses is provided as a template, which is placed at least partly on said plane sections and surrounds said circumferential lines of said individual microlenses, and during said temperature treatment all said microlenses are heated uniformly and homogeneously.

9. The method of claim 8, wherein the microlens are equidistantly spaced.

10. The method according to claim 1, wherein said temperature treatment occurs in such a manner that a reduction of said convex lens surface stems solely from the surface tensions acting along said convex lens surface, with the lens material being forced out of the regions of said elliptical gradient on the convex-side into other regions of the lens body.

11. The method of claim 1, wherein the optical lens is a microlens.

12. The method of claim 1, wherein the contour comprises a pre-existing elliptical gradient at an edge region of the at least one optical lens.

* * * * *